(12) United States Patent
Feng

(10) Patent No.: US 9,166,406 B2
(45) Date of Patent: Oct. 20, 2015

(54) POWER SOURCE SWITCHING CIRCUIT AND POWER SOURCE SWITCHING SYSTEM WITH POWER SOURCE SWITCHING CIRCUIT

(71) Applicant: ShenZhen Goldsun Network Intelligence Technology Co., Ltd., Shenzhen (CN)

(72) Inventor: Wen-Kao Feng, Shenzhen (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 450 days.

(21) Appl. No.: 13/727,970

(22) Filed: Dec. 27, 2012

(65) Prior Publication Data

US 2013/0285458 A1    Oct. 31, 2013

(30) Foreign Application Priority Data

Apr. 27, 2012   (CN) .......................... 2012 1 0126801

(51) Int. Cl.
*H02J 7/00* (2006.01)
*H02J 3/00* (2006.01)
*H02J 1/10* (2006.01)
*H02J 9/06* (2006.01)

(52) U.S. Cl.
CPC .. *H02J 3/005* (2013.01); *H02J 1/10* (2013.01); *H02J 2009/068* (2013.01); *Y10T 307/62* (2015.04); *Y10T 307/696* (2015.04)

(58) Field of Classification Search
USPC ...................................... 307/65, 80
See application file for complete search history.

(56) References Cited

U.S. PATENT DOCUMENTS 7,877,169 B2 *   1/2011   Slota et al. ................. 700/286
2006/0221533 A1 * 10/2006  Lathrop et al. ............. 361/160

* cited by examiner

*Primary Examiner* — Danny Nguyen
(74) *Attorney, Agent, or Firm* — Novak Druce Connolly Bove + Quigg LLP

(57) ABSTRACT

A power source switching circuit, includes a first and second contact, a first, second, and third relay. The first contact includes a first normally open main contact and a first normally closed auxiliary contact. The second contact includes a second normally open main contact and a second normally closed auxiliary contact. The first, second, third normally open contacts of the first, second, third relays, connected in series, are connected between three phrase lines of the main power source and the second normally closed auxiliary contact. The second normally closed auxiliary contact is connected to a zero line of the main power source. The first, second, third normally closed contacts, connected in parallel, are connected between three phrase lines of the auxiliary power source and the first normally closed auxiliary contact. The first normally closed auxiliary contact is connected to a zero line of the auxiliary power source.

4 Claims, 2 Drawing Sheets

POWER SOURCE SWITCHING CIRCUIT AND POWER SOURCE SWITCHING SYSTEM WITH POWER SOURCE SWITCHING CIRCUIT

BACKGROUND

1. Technical Field

The disclosure generally relates to a power source switching circuit and a power source switching system.

2. Description of Related Art

A conventional power supply system includes a main power source and an auxiliary power source. The auxiliary power source is manually switched to supply power to loaders when the main power source is out of work, which is inconvenient and unsafe.

Thus, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
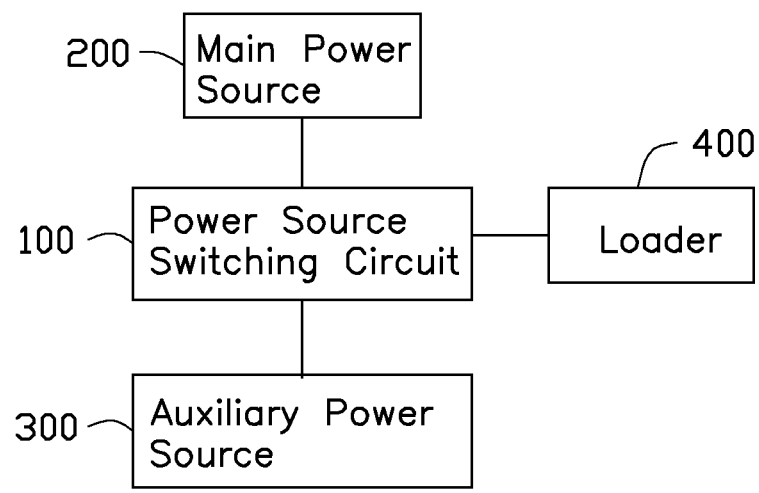
FIG. 1 is a schematic view of a power source switching system in accordance with an embodiment.

FIG. 1 shows one embodiment of a power source switching system. The power source switching system includes a power source switching circuit 100, a main power source 200, and an auxiliary power source 300. The power source switching circuit 100 is connected to a loader 400. The main power source 200 and the auxiliary power source 300 are three-phrase alternating current power sources.

Figure 2:
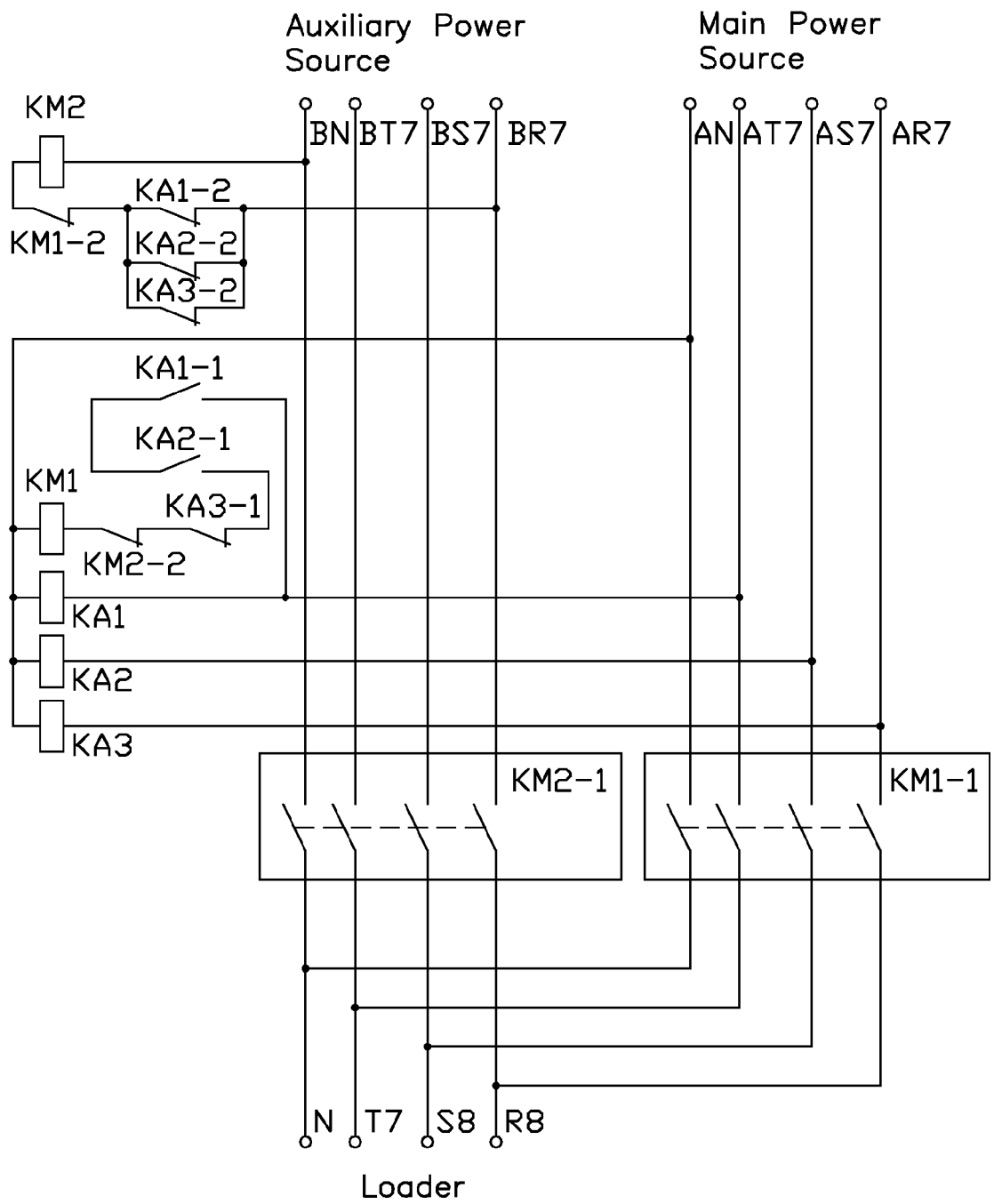
FIG. 2 is a diagram of a power source switching circuit in accordance with an embodiment.

FIG. 2 shows that the power source switching circuit 100 includes a first contact KM1, a second contact KM2, a first relay KA1, a second relay KA2, and a third relay KA3.

The main power source 200 is connected to the loader 400 via a first power contact KM1-1 of the first contact KM1. The auxiliary power source 300 is connected to the loader 400 via a second power contact KM2-1 of the second contractor KM2. The three phrase lines AR7, AS7, AT7 of the main power source 200 are connected to the third relay KA3, the second relay KA2, and the first relay KA1. The third relay KA3, the second relay KA2, and the first relay KA1 are connected to the zero line AN of the main power source 200. The phrase line AT7 is connected to the normally open contacts KA1-1, KA2-1, KA3-1 in series and then is connected to one terminal of the normally closed auxiliary contact KM2-2 of the second contact KM2. The other terminal of the normally closed auxiliary contact KM2-2 is connected to the first contact KM1. The first contact KM1 is connected to the zero line AN of the main power source 200.

The phrase line BR7 of the auxiliary power source 300 is connected to the normally closed contacts KA1-2, KA2-2, KA3-2 in parallel and then connected to one terminal of the normally closed auxiliary contact KM1-2 of the contact KM1. The other terminal of the normally closed auxiliary contact KM1-2 is connected to the zero line BN of the auxiliary power source 300.

During use, the main power source 200 supplies power, the normally open contact KA1-1 of the first relay KA1, the normally open contact KA2-1 of the second relay KA2, and the normally open contact KA3-1 of the third relay KA3 are turned on. At the time, the normally closed contacts KA1-2, KA2-2, KA3-2 are turned off to enable the second contact KM2 to be out of work. The normally closed auxiliary contact KM2-2 of the second contact KM2 is turned on to enable the first contact KM1 to be on work. The first normally open main contact KM1-1 of the first contact KM1 is turned on to enable the main power source 200 to supply power to the loader 400.

When the main power source 200 is not working, the normally closed contacts KA1-2, KA2-2, KA3-2 and the normally closed auxiliary contact KM1-2 of the first contact KM1 are turned on. At this time, the second normally main contact KM2-1 of the second contact KM2 is turned on to enable the auxiliary power source 300 to supply power to the loader 400.

It is to be understood, however, that even though numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power source switching circuit, comprising:
a first contact, the first contact comprises a first normally open main contact and a first normally closed auxiliary contact, the first normally open main contact configured to be connected between a main power source and a loader;
a second contact, the second contact comprises a second normally open main contact and a second normally closed auxiliary contact, the second normally open main contact configured to be connected between an auxiliary power source and the loader;
a first relay, and the first relay comprises a first normally open contact and a first normally closed contact;
a second relay, and the second relay comprises a second normally open contact and a second normally closed contact; and
a third relay, and the third relay comprises a third normally open contact and a third normally closed contact;
wherein the first normally open contact, the second normally open contact, and the third normally open contact, connected in series, are configured to be connected between three phase lines of the main power source and the second normally closed auxiliary contact; the second normally closed auxiliary contact is configured to be connected to a zero line of the main power source; the first normally closed contact, the second normally closed contact, and the third normally closed contact, connected in parallel, are configured to be connected between three phase lines of the auxiliary power source and the first normally closed auxiliary contact; and the first normally closed auxiliary contact is configured to be connected to a zero line of the auxiliary power source.

2. A power source switching system, comprising:
a main power source, and the main power source comprises three first phase lines and a first zero line;
an auxiliary power source, and the auxiliary power source comprises three second phase lines and a second zero line; and
a power source switching circuit, and the power source switching circuit comprises:
- a first contact, and the first contact comprises a first normally open main contact and a first normally closed auxiliary contact, and the first normally open main contact configured to be connected between the main power source and a loader;
- a second contact, and the second contact comprises a second normally open main contact and a second normally closed auxiliary contact, and the second normally open main contact configured to be connected between the auxiliary power source and the loader;
- a first relay, and the first relay comprises a first normally open contact and a first normally closed contact;
- a second relay, and the second relay comprises a second normally open contact and a second normally closed contact; and
- a third relay, and the third relay comprises a third normally open contact and a third normally closed contact;
wherein the first normally open contact, the second normally open contact, and the third normally open contact, connected in series, are connected between the three first phase lines and the second normally closed auxiliary contact; the second normally closed auxiliary contact is connected to a zero line of the main power source; the first normally closed contact, the second normally closed contact, and the third normally closed contact, connected in parallel, are connected between three phase lines of the auxiliary power source and the first normally closed auxiliary contact; and the first normally closed auxiliary contact is connected to a zero line of the auxiliary power source.

3. The power source switching system of claim 2, wherein the main power source is a three phase alternating current power source.

4. The power source switching system of claim 2, wherein the auxiliary power source is a three phase alternating current power source.

* * * * *